United States Patent
Hur (10) Patent No.: US 7,689,185 B2
(45) Date of Patent: Mar. 30, 2010

(54) APPARATUS AND METHOD FOR ESTIMATING INITIAL FREQUENCY OFFSET IN AN ASYNCHRONOUS MOBILE COMMUNICATION SYSTEM

(75) Inventor: Seong-Ho Hur, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1127 days.

(21) Appl. No.: 11/002,317

(22) Filed: Dec. 3, 2004

(65) Prior Publication Data

US 2005/0186924 A1 Aug. 25, 2005

(30) Foreign Application Priority Data

Feb. 11, 2004 (KR) .................. 10-2004-0008988

(51) Int. Cl.
- H04B 1/18 (2006.01)
- H04B 7/00 (2006.01)
- H04Q 7/20 (2006.01)

(52) U.S. Cl. ............... 455/161.1; 455/525; 455/455; 455/502

(58) Field of Classification Search ........... 455/161.1, 455/164.1, 173.1, 182.2, 192.2, 226.1, 67.11, 455/63.1, 524, 525, 502, 161, 1; 375/340, 375/343; 370/342, 328, 335
See application file for complete search history.

(56) References Cited

U.S. PATENT DOCUMENTS

| | | | | |
|---|---|---|---|---|
| 5,375,254 A | * | 12/1994 | Owen | 455/525 |
| 5,794,146 A | * | 8/1998 | Sevcik et al. | 455/434 |
| 5,969,571 A | * | 10/1999 | Swanson | 330/10 |
| 6,223,042 B1 | * | 4/2001 | Raffel | 455/455 |
| 6,477,372 B1 | * | 11/2002 | Otting et al. | 455/434 |
| 6,608,858 B1 | * | 8/2003 | Sih et al. | 375/147 |
| 6,873,826 B2 | * | 3/2005 | Becker | 455/67.11 |
| 6,892,072 B2 | * | 5/2005 | Hayoun | 455/442 |
| 7,054,299 B2 | * | 5/2006 | Ben-Eli et al. | 370/342 |
| 7,215,935 B2 | * | 5/2007 | Rao et al. | 455/161.1 |
| 2003/0032441 A1 | * | 2/2003 | Ofuji et al. | 455/525 |
| 2005/0095985 A1 | * | 5/2005 | Hafeoz | 455/67.11 |

FOREIGN PATENT DOCUMENTS

| | | |
|---|---|---|
| JP | 09-055646 | 2/1997 |
| JP | 10004341 | 1/1998 |
| JP | 11-261522 | 9/1999 |
| JP | 2002509656 | 3/2002 |
| JP | 2002-353859 | 12/2002 |
| JP | 2003-153326 | 5/2003 |
| JP | 2003-169369 | 6/2003 |
| JP | 2005167470 | 6/2005 |
| WO | WO9530274 | 11/1995 |

* cited by examiner

Primary Examiner—Tilahun Gesesse
(74) Attorney, Agent, or Firm—Roylance, Abrams, Berdo & Goodman, L.L.P.

(57) ABSTRACT

An apparatus and method for estimating an initial frequency offset in a mobile communication system in which a user equipment (UE) performs initial cell search in order to identify a Node B with which the UE can exchange data is provided. The apparatus comprises a memory for storing a plurality of pulse duration modulation (PDM) hypotheses and storing the PDM hypotheses therein; a step#1 cell searcher for performing a step#1 cell search on each of the PDM hypotheses through a primary synchronization channel and outputting the cell search result to the memory; and an initial frequency offset estimator for determining an initial frequency offset estimation value from the cell search results for the PDM hypotheses.

13 Claims, 4 Drawing Sheets

APPARATUS AND METHOD FOR ESTIMATING INITIAL FREQUENCY OFFSET IN AN ASYNCHRONOUS MOBILE COMMUNICATION SYSTEM

PRIORITY

This application claims priority under 35 U.S.C. §119(a) to an application entitled "Apparatus and Method for Estimating Initial Frequency Offset in an Asynchronous Mobile Communication System" filed in the Korean Intellectual Property Office on Feb. 11, 2004 and assigned Ser. No. 2004-8988, the entire contents of which are incorporated herein by reference.

BACKGROUND OF THE INVENTION

1. Field of the Invention

The present invention relates generally to an asynchronous mobile communication system. In particular, the present invention relates to an apparatus and method for estimating an initial frequency offset.

2. Description of the Related Art

Mobile communication systems can typically be classified into synchronous systems and asynchronous systems. The synchronous systems have mainly been adopted in the United States, while the asynchronous systems have been mainly adopted in Europe.

With the recent rapid growth of the mobile communication industry, future mobile communication systems capable of supporting not only voice service but also data and image services are attracting public attention, and standardization work on the future mobile communication systems is being conducted. However, the United States and Europe which are adopting different mobile communication systems are each independently carrying out separate standardizations. The European future mobile communication system is one of the new standards and is known as a Universal Mobile Telecommunication System (UMTS).

Typically, in order to search for a Node B (or base station transceiver subsystem (BTS)), a user equipment (UE; or mobile station) comprising a mobile communication system requires the performance of frequency offset estimation and compensation for a carrier frequency. Frequency offset estimation and compensation greatly affect a Node B search time and call quality. The term "frequency offset" refers to a frequency variation occurring when a carrier frequency received from a Node B varies according to various factors (e.g., Node B signal distortion or a Doppler frequency) due to a channel environment, and a UE performs frequency offset estimation and compensation in order to match a transmission/reception frequency of the UE with a transmission/reception frequency of a Node B by removing the frequency offset.

For example, if a carrier frequency is 2.14 GHz, a carrier frequency $F_r$ that a UE receives becomes 2.14 GHz+$\Delta f_r$ as a specific frequency offset $\Delta f_r$ is added to the carrier frequency 2.14 GHz generated in a transmission side. Therefore, the UE can normally restore a received signal by estimating and compensating for the frequency offset $\Delta f_r$. Generally, the frequency offset $\Delta f_r$ is a value in which a frequency distortion $\Delta f_{drift\_in\_BTS}$ in a Node B and a Doppler frequency $\Delta f_D$ are reflected.

Frequency offset estimation by a UE is performed through an automatic frequency controller (hereinafter referred to as "AFC"). An operating principle of the AFC is to correct a frequency of a received signal by comparing a received signal's frequency $F_r$ with a carrier frequency in which an estimated specific frequency offset $\Delta f_r$ is reflected and continuously compensating for a difference. A detailed implementation method will be described below.

Figure 1:
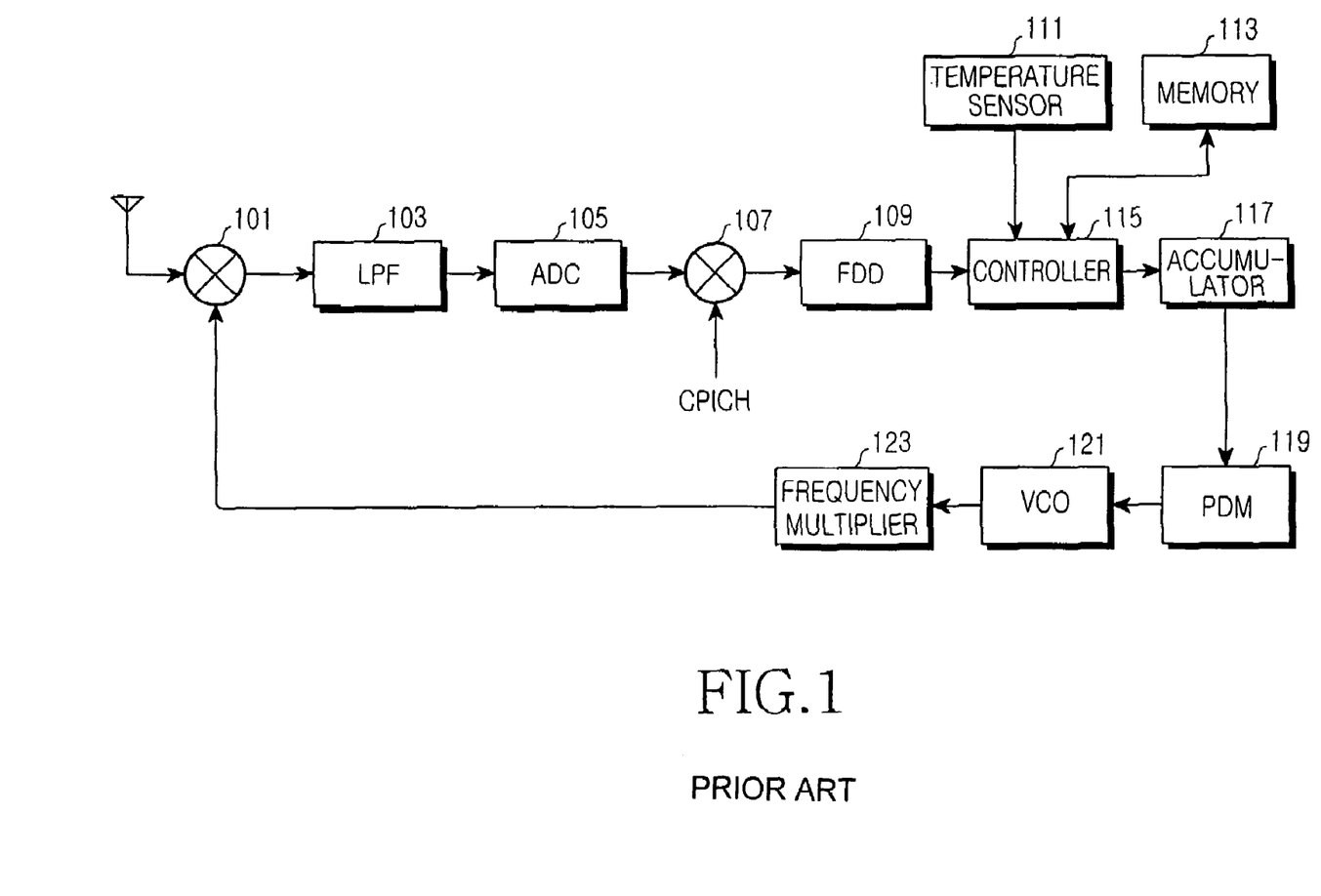
FIG. 1 is a block diagram illustrating a frequency offset estimation apparatus in an asynchronous mobile communication system according to the prior art.

The AFC has two limitations: it cannot trace all frequency offsets because of the limited loop bandwidth, and it must know a cell scrambling code and its timing. In other words, it can operate after completion of a cell search. However, in an asynchronous mobile communication system, because it is not possible to know a cell scrambling code before acquiring a cell, the AFC cannot be used. Therefore, estimating a frequency offset before performing cell search is required, and a temperature-based frequency estimation method used in a UE supporting a synchronous mobile communication system can be used as a method for estimating an initial frequency offset. With reference to FIG. 1, a description will now be made of a temperature-based initial frequency estimation method according to the prior art.

FIG. 1 is a block diagram illustrating a frequency offset estimation apparatus in an asynchronous mobile communication system according to the prior art. Referring to FIG. 1, the frequency offset estimation apparatus can comprise a first multiplier 101, a low pass filter (LPF) 103, an analog-to-digital converter (ADC) 105, a second multiplier 107, a frequency difference detector (FDD) 109, a temperature sensor 111, a memory 113, a controller 115, an accumulator 117, a pulse duration modulator (PDM) 119, a voltage controlled oscillator (VCO) 121 and a frequency multiplier 123.

The FDD 109 divides an output signal of the second multiplier 107 into I-channel symbols and Q-channel symbols, and detects a frequency difference by performing a specific operation (e.g., $I(n)Q(n-1)-I(n-1)Q(n)$) on current symbols and previous symbols. In general, a frequency difference detected through the above operation is output after detection results for 4 symbols are reflected (i.e., accumulated).

The controller 115 selects an output value from the FDD 109 and a value read from the memory 113, and outputs the selected value to the accumulator 117. As stated, in an initial state, because the AFC does not normally operate, the controller 115 reads as an initial frequency offset a value stored in the memory 113 instead of the output value of the FDD 109 and outputs the read value to the accumulator 117.

More specifically, the temperature-based frequency estimation method according to the prior art estimates an initial frequency offset by measuring a temperature by means of the temperature sensor 111 and by reading a frequency offset corresponding to the measured temperature from a table stored in the memory 113, in which relationships between temperatures and frequency offsets are stored. Therefore, the controller 115 receives an ambient temperature value of the voltage controlled oscillator 121 from the temperature sensor 111, reads a frequency offset corresponding to the measured temperature based on the relationships between temperatures and frequency offsets, previously stored in the memory 113, and outputs the read frequency offset to the accumulator 117. The accumulator 117 accumulates a currently received value to add to a previously stored value, and outputs the accumulated value to the PDM 119. The PDM 119 generates a pulse corresponding to an initial frequency offset generated according to the temperature, and outputs the generated pulse to the voltage controlled oscillator 121.

The voltage controlled oscillator 121 generates a specific oscillation frequency according to the pulse value output from the PDM 119. The oscillation frequency output from the voltage controlled oscillator 121 is subject to frequency multiplication in the frequency multiplier 123, generating a carrier frequency (i.e., radio frequency). An output of the frequency multiplier 123 is multiplied by a received signal in the first multiplier 101.

If an initial frequency offset is estimated in this manner by the initial frequency offset generated according to a temperature, estimation of a next frequency offset is performed by an AFC through the above-stated AFC operation. Meanwhile, in the initial frequency offset estimation process, because the AFC does not normally operate as stated above, the controller 115 selected the value read from the memory 113. However, when the AFC normally operates by the initial frequency offset estimation, the controller 115 selects the output value of the FDD 109. That is, as a loop of the AFC continuously performs a normal operation, although a received frequency is changed, it is possible to trace the changed frequency offset.

For the voltage controlled oscillator 121, an oven controlled temperature compensated crystal oscillator (OCTCXO) or a voltage controlled temperature compensated crystal oscillator (VCTCXO) is used as a reference frequency generator.

Meanwhile, in the asynchronous mobile communication system, the temperature-based frequency estimation method used in the synchronous mobile communication system can be used as a method for estimating an initial frequency offset before completion of a cell search. As stated, the temperature-based frequency estimation method estimates an initial frequency offset by measuring an ambient temperature of a place where the VCTCXO operates and by reading a frequency offset corresponding to the measured temperature from a table in which a relationship between temperatures and frequency offsets are stored.

However, because such a method estimates an initial frequency offset based on a table in which relationships between temperatures and frequency offsets are stored, an extra memory for storing the relationships is required, a unique table must be set up for each VCTCXO used in each UE, and the table must be changed after a run time of the VCTCXO. Actually, the VCTCXOs, though they are the same model made by the same company, show considerably different characteristics, and the characteristics vary undesirably over time.

In addition, although an initial frequency offset is estimated based on a value stored in the table in order to compensate for an influence of temperature, an initial frequency offset between a frequency transmitted by a Node B and a frequency generated by a UE to receive a signal transmitted by the Node B can show a considerably large value. Actually, in a $3^{rd}$ Generation Partnership Project (3GPP) asynchronous system, when a Doppler frequency is taken into consideration, an initial carrier frequency offset is about 7.5 KHz and a system clock frequency offset is about 100 Hz.

When an initial frequency offset is considerably large, an AFC fails in frequency offset compensation and a long time is required until a frequency offset is compensated. That is, a very long time is required until a frequency offset is corrected because after a step#3 cell search is performed with an initially estimated frequency offset, if the cell search failed, an accurate frequency offset is detected by reading another frequency offset from a table in which relationships between temperatures and frequency offsets are stored and repeating the step#3 cell search for the read frequency offset. This causes call failure or a deterioration in call quality.

SUMMARY OF THE INVENTION

It is, therefore, an object of the present invention to provide an apparatus and method for efficiently and reliably estimating an initial frequency offset by using a step#1 cell search in an asynchronous mobile communication system.

To achieve the above and other objects, there is provided a method for estimating an initial frequency offset by a user equipment (UE) in a mobile communication system in which the UE performs an initial cell search in order to identify a Node B with which the UE can exchange data. The method comprising the steps of performing step#1 cell search on each of pulse duration modulation (PDM) hypotheses through a primary synchronization channel; storing the cell search result; determining an initial frequency offset estimation value from the cell search results for the PDM hypotheses; and estimating a frequency offset using the determined initial frequency offset estimation value.

To achieve the above and other objects, there is provided an apparatus for estimating an initial frequency offset in a mobile communication system in which a user equipment (UE) performs an initial cell search in order to identify a Node B with which the UE can exchange data. The apparatus comprising a memory for storing a plurality of pulse duration modulation (PDM) hypotheses and storing the PDM hypotheses therein; a step#1 cell searcher for performing step#1 cell search on each of the PDM hypotheses through a primary synchronization channel and outputting the cell search result to the memory; and an initial frequency offset estimator for determining an initial frequency offset estimation value from the cell search results for the PDM hypotheses.

BRIEF DESCRIPTION OF THE DRAWINGS

The above and other objects, features and advantages of the present invention will become more apparent from the following detailed description when taken in conjunction with the accompanying drawings in which.

In the drawings, it should be understood that like reference numbers refer to like features and structures.

DETAILED DESCRIPTION OF THE PREFERRED EMBODIMENT

Several embodiments of the present invention will now be described in detail with reference to the accompanying drawings. In the following description, a detailed description of known functions and configurations incorporated herein has been omitted for conciseness.

The present invention provides a more effective, and more reliable initial frequency offset estimation method using a primary synchronization channel (P-SCH) used for cell searching in an asynchronous mobile communication system. Therefore, because a current channel condition can be correctly reflected, the new initial frequency offset estimation method is more reliable than the conventional temperature-based initial frequency offset estimation method. In addition, a separate table for storing temperature-frequency offset relations is not required, and reliable initial frequency offset estimation is available irrespective of characteristic variations due to instability of the VCTCXO.

A UE supporting an asynchronous mobile communication system performs a 3-step cell search including a first step (herein referred to as step#1) cell search, a second step (herein referred to as step#2) cell search and a third step (herein referred to as step#3) cell search for cell acquisition (i.e., Node B identification). The step#1 cell search acquires slot synchronization using P-SCH, the step#2 cell search acquires Node B group code-related information and frame synchronization by a secondary synchronization channel (S-SCH), and the step#3 cell search acquires a Node B code using a common pilot channel (CPICH).

Because embodiments of the present invention estimate an initial frequency offset using a step#1 cell searcher that performs the step#1 cell search using P-SCH, the estimation can be achieved by combining existing hardware without additional hardware.

Figure 2:
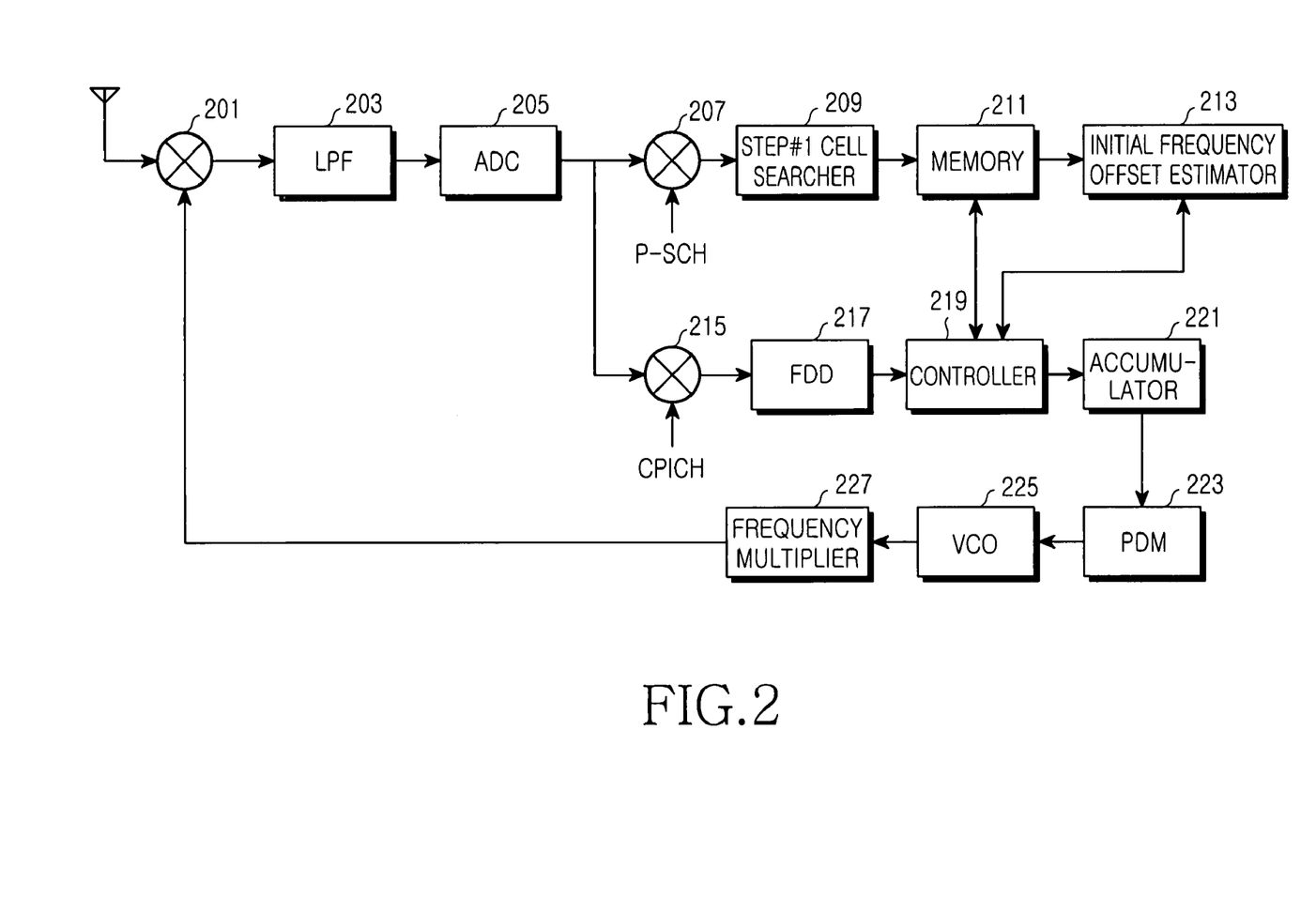
FIG. 2 is a block diagram illustrating an initial frequency offset estimation apparatus using step#1 cell search according to an embodiment of the present invention.

With reference to FIG. 2, a detailed description will now be made of a frequency offset estimation method for estimating an initial frequency offset using a step#1 cell search according to an embodiment of the present invention.

FIG. 2 is a block diagram illustrating an initial frequency offset estimation apparatus using a step#1 cell search according to an embodiment of the present invention. Referring to FIG. 2, the frequency offset estimation apparatus according to an embodiment of the present invention can comprise a first multiplier 201, a low pass filter (LPF) 203, an analog-to-digital converter (ADC) 205, a second multiplier 207, a step#1 cell searcher 209, a memory 211, an initial frequency offset estimator 213, a third multiplier 215, a frequency difference detector (FDD) 217, a controller 219, an accumulator 221, a pulse duration modulator (PDM) 223, a voltage controlled oscillator (VCO) 225, and a frequency multiplier 227.

While the conventional temperature-based initial frequency offset estimation apparatus estimates an initial frequency offset using a table representing relationships between temperatures and frequency offsets, a new initial frequency offset estimation apparatus according to an embodiment of the present invention sets up a plurality of PDM hypotheses and estimates as an initial frequency offset a frequency offset for PDM in which a maximum peak energy value is detected through a step#1 cell search for each PDM hypothesis. That is, the new initial frequency offset estimation apparatus divides PDM values providing a control voltage for a temperature compensated crystal oscillator (TCXO) provided to generate an oscillation frequency at predetermined intervals and estimates an initial frequency offset from a result of the step#1 cell search on each PDM value.

The PDM hypothesis values are stored in the memory 211, and the step#1 cell search is performed on each PDM hypothesis. A result of the step#1 cell search on each PDM hypothesis is stored in the memory 211 or a separate memory. However, for convenience, it will be assumed herein that the result of the step#1 cell search on each PDM hypothesis is stored in the memory 211. The initial frequency offset estimator 213 estimates an initial frequency offset by determining an optimal PDM value from the step#1 cell search results on all of the PDM hypotheses stored in the memory 211. A method for determining an optimal PDM value from the step#1 cell search results can be implemented in several ways, and a detailed description thereof will be provided below.

First, a method for performing the step#1 cell search on each PDM hypothesis will be described in more detail. As stated, the PDM hypotheses are stored in the memory 211, and the step#1 cell search is sequentially performed on the PDM hypotheses. When the controller 219 reads a data value for one of the PDM hypothesis stored in the memory 211, it applies the read data value for the PDM hypothesis to the accumulator 221.

When the controller 219 inputs an output of the FDD 217 to the accumulator 221, the accumulator 221 adds the current input value to a previously stored value and provides the output to the PDM 223. However, when the controller 219 inputs a PDM hypothesis read from the memory 211 to the accumulator 221, the accumulator 221 bypasses the read PDM hypothesis and provides an output to the PDM 223. The PDM 223 generates a pulse corresponding to a data value for the read PDM hypothesis and outputs the generated pulse to the voltage controlled oscillator 225.

The voltage controlled oscillator 225, a device for generating a specific oscillation frequency according to an input voltage value, generates a specific oscillation frequency according to a pulse value output from the PDM 223. An oscillation frequency output from the voltage controlled oscillator 225 is subject to frequency multiplication in the frequency multiplier 227, outputting a carrier frequency (i.e., radio frequency). An output of the frequency multiplier 227 is multiplied by a received signal in the first multiplier 201.

A reception signal $F_r$ received through an antenna is multiplied by a signal generated based on the PDM hypothesis by the first multiplier 201, and an output signal of the first multiplier 201 is multiplied by a P-SCH signal in the second multiplier 207 after passing through the LPF 203 and the ADC 205. An output signal of the second multiplier 207 is input to the step#1 cell searcher 209, and the step#1 cell searcher 209 performs a step#1 cell search procedure. An operating procedure of the step#1 cell searcher 209 is defined in a 3GPP standard specification which is incorporated herein in its entirety by reference, and is generally made in the form of a pruned efficient Golay correlator (PEGC).

When the step#1 cell searcher 209 completes the step#1 cell search on one of the PDM hypothesis, it stores the cell search result in the memory 211 as a peak energy value. If the step#1 cell search on all PDM hypotheses is completed in this manner, peak energy values for the PDM hypotheses are stored in the memory 211. The initial frequency offset estimator 213 compares the peak energy values for the PDM hypotheses stored in the memory 211 and determines an initial frequency offset estimation value based on a PDM hypothesis having a maximum peak energy value or an average value for a predetermined number of PDM hypotheses having a higher peak energy value. The method for determining an initial frequency offset estimation value from the step#1 cell search results for the PDM hypotheses can be modified in several ways, and a detailed description thereof will be provided below.

The controller 219 receives an initial frequency offset estimation value which was determined by the initial frequency offset estimator 213 and outputs the received initial frequency offset estimation value to the accumulator 221. The accumulator 221 bypasses a PDM hypothesis having the maximum peak energy value read from the memory 211 to the PDM 223. The PDM 223 generates a pulse corresponding to an initial frequency offset determined according to an embodiment of the present invention, and outputs the generated pulse to the voltage controlled oscillator 225.

The voltage controlled oscillator 225, a device for generating a specific oscillation frequency according to an input voltage value, generates a specific oscillation frequency according to a pulse value output from the PDM 223. An oscillation frequency output form the voltage controlled oscillator 225 is subject to frequency multiplication in the frequency multiplier 227, outputting a carrier frequency (i.e., radio frequency). An output of the frequency multiplier 227 is multiplied by a received signal in the first multiplier 201.

If an initial frequency offset is estimated in this way based on an initial frequency offset generated according to an embodiment of the present invention, next frequency offset estimation is subject to automatic frequency control by the above-described AFC's operation. That is, in order to estimate an accurate frequency offset from an output value determined by an operation between a signal received at the first multiplier 201 and an estimated signal, an output signal of the first multiplier 201 passes through the LPF 203, the ADC 205, the third multiplier 215 and the FDD 217. Meanwhile, in the initial frequency offset estimation process, because the AFC does not normally operate as stated above, the controller 219 selected the value read from the memory 213. However, from a time when the AFC normally operates by the initial frequency offset estimation, the controller 219 selects the output value of the FDD 217. That is, as a loop of the AFC continuously performs a normal operation, although a received frequency is changed, it is possible to trace the changed frequency offset.

A structure of the step#1 cell searcher 209 used to implement the present invention will now be described in more detail with reference to FIG. 3. The detailed structure of the step#1 cell searcher is shown as an example. However, the embodiment of the present invention is not limited to the example shown. Therefore, it is obvious that each of the blocks illustrated in FIG. 3 can be modified for efficient step#1 cell search. Embodiments of the present invention are characterized by deterring an initial frequency offset estimation value using an output value of the step#1 cell searcher.

Figure 3:
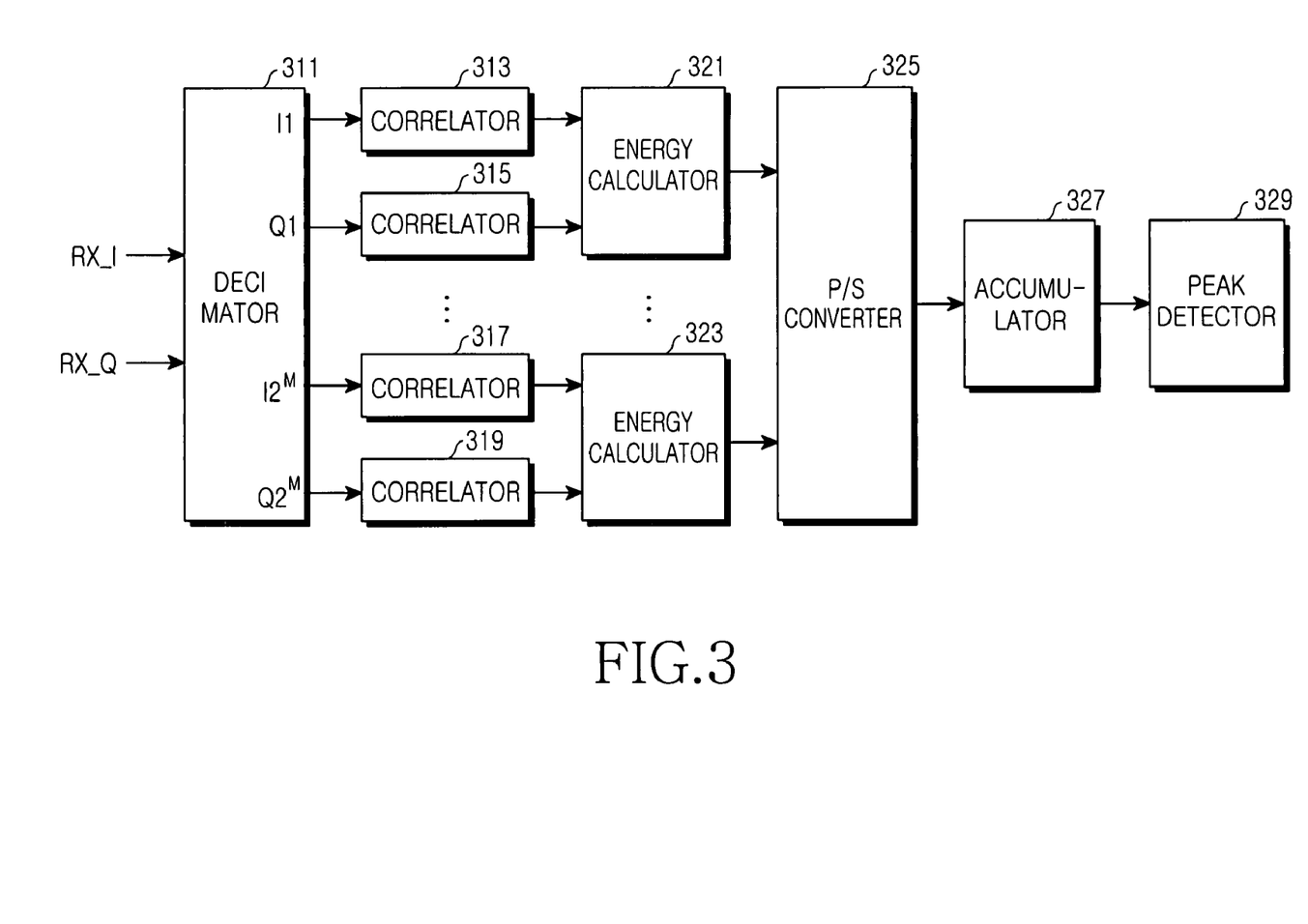
FIG. 3 is a block diagram illustrating a structure of a step#1 cell searcher used in an asynchronous mobile communication system according to an embodiment of the present invention.

FIG. 3 is a block diagram illustrating a structure of a step#1 cell searcher used in an asynchronous mobile communication system according to an embodiment of the present invention. Referring to FIG. 3, the step#1 cell searcher 209 of FIG. 2 detects a correlation value between a signal received at a UE and a P-SCH signal generated in the UE at all hypothesis points arranged at specified intervals, or intervals of ½ chip within one slot. The step#1 cell searcher 209 detects from the detected correlation values a plurality of slot timings having a correlation value that is a peak value and is higher than a predetermined threshold.

When a P-SCH signal comprised of an I-channel signal and a Q-channel signal is received at the step#1 cell searcher 209, the received P-SCH signal is applied to a decimator 311. Here, 2S (S=0, 1, 2, . . . ) P-SCH signals are input to the decimator 311 per chip. The decimator 311 selects 2M P-SCH signals (where M<S), for which 2S P-SCH signals are received per chip, and outputs the selected signals in parallel. The P-SCH signals output in parallel from the decimator 311 are input to correlators 313, 315, 317 and 319, respectively. Here, the required number of the correlators is equal to the number of I-channel and Q-channel components for the 2M P-SCH signals output from the decimator 311.

Among the correlators, the correlators 313 and 315 detect correlation values with a P-SCH code generated by the step#1 cell searcher 209 for on-time I-channel and on-time Q-channel signal components of the P-SCH signal, while the correlators 317 and 319 detect correlation values with the P-SCH code for late-time I-channel and late-time Q-channel signal components for the P-SCH signal. Here, the correlators 313, 315, 317 and 319, being pruned efficient Golay correlators (PEGCs), calculate correlation values between the received I-channel or Q-channel signals and the P-SCH code, and output the calculated correlation values per chip. The PEGC is a kind of a matched filter, and its filter depth is 256 chips because a symbol size of P-SCH is 256 chips. If the PEGC receives 256-chip data in addition to 1-slot reception data, it indicates timing having a maximum value and its energy.

Correlation values output from the correlators 313 and 315 that detect correlation values corresponding to on-time I-channel and on-time Q-channel signal components of the P-SCH signal are output to an energy calculator 321 that detects correlation energy for the on-time I-channel and on-time Q-channel signal components of the P-SCH signal. Similarly, correlation values output from the correlators 317 and 319 that detect correlation values corresponding to late-time I-channel and late-time Q-channel signal components of the P-SCH signal are output to an energy calculator 323 that detects correlation energy for the late-tine I-channel and late-time Q-channel signal components of the P-SCH signal. The energy calculator 321 squares the correlation values for the on-time I-channel and on-time Q-channel signal components of the P-SCH signal, output from the correlators 313 and 315, adds up the squared correlation values, and outputs the added value to a parallel-to-signal (P/S) converter 325. Similarly, the energy calculator 323 squares the correlation values for the late-time I-channel and late-time Q-channel signal components of the P-SCH signal, output from the correlators 317 and 319, adds up the squared correlation values, and outputs the added value to the P/S converter 325.

The P/S converter 325 serial-converts the correlation energies for the on-time I-channel and on-time Q-channel components of the P-SCH signal and the late-time I-channel and late-time Q-channel components of the P-SCH signal, output from the energy calculators 321 and 323. Here, the P/S converter 325 receives the correlation energies at intervals of Tc/2M, and sequentially outputs the received correlation energies, i.e., 2M correlation energies. The 2M correlation energies output from the P/S converter 325 are input to an accumulator 327. The accumulator 327 adds the correlation energies output from the P/S converter 325 to the accumulated correlation energies for corresponding hypothesis points for a predetermined number of times. After completion of the accumulation, the accumulator 327 outputs the total correlation energy to a peak detector 329.

The peak detector 329 then detects K1 accumulated correlation energies having a maximum energy value while being a peak value from the accumulated correlation energies for 2560×2M hypothesis points, output from the accumulator 327. A controller (not shown) compares the K1 accumulated correlation energies detected by the peak detector 329 to a predetermined threshold, and if there is any accumulated correlation energy higher than the threshold, the controller determines that the step#1 cell search is completed.

Therefore, the step#1 cell search is performed on each of a plurality of predetermined PDM hypotheses, and a peak value for each of the PDM hypotheses is stored as stated. In addition, an initial frequency offset is estimated from the stored peak values.

Figure 4:
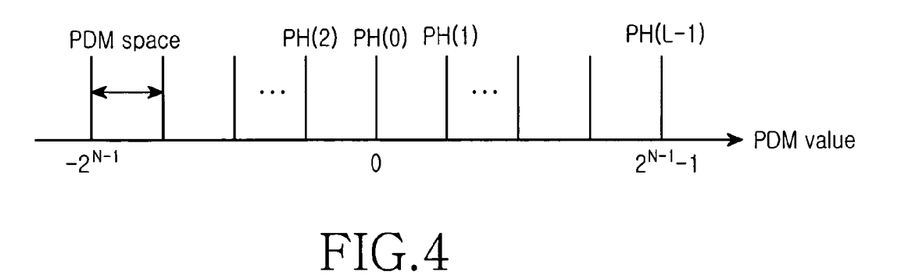
FIG. 4 is a diagram illustrating a method for storing pulse duration modulation (PDM) hypotheses according to an embodiment of the present invention.

A method for setting up the PDM hypotheses will now be described in detail with reference to FIG. 4. The method for setting up the PDM hypotheses can also be implemented in several ways, and it is preferable to set up the PDM hypotheses by dividing the entire PDM interval at predetermined intervals.

For example, it is assumed herein that the PDM comprises N bits and its value has a 2's complement. In this case, the PDM has a value of $-2^{N-1}$-$2^{N-1}-1$. That is, if the PDM comprises 9 bits, it has a value of −256~255.

In order to set up the PDM hypotheses, a PDM space is first calculated. The PDM space is set up so as to be narrower than or equal to a bandwidth of AFC, i.e., a PDM range that can be independently traced by AFC hardware, used for frequency offset estimation after completion of cell search after a cell scrambling code is acquired through experiment or simulation. Because the initial frequency offset estimation value will be used in the AFC hardware, it is preferable to set the PDM space to a value shorter than the hardware trace range. Here, the set PDM space is referred to as 'S'.

Thereafter, the PDM hypotheses PH are calculated. The PDM hypotheses mean values are read by the controller 219 of FIG. 2 from the memory 211 for an initial frequency offset estimation test. PDM hypotheses to be used are calculated by a value S previously determined within the PDM interval. Therefore, the total number L of the PDM hypotheses becomes $[2^N/S]$. Here, [•] denotes a Gaussian sign and indicates a value below a decimal point is discarded. For example, if it is assumed that a 9-bit PDM is used and its PDM space is S=20, L=[512/20]=25. That is, 25 PDM hypotheses exist.

Next, the step#1 cell search described in connection with FIGS. 2 and 3 is performed on each of the calculated L PDM hypotheses. As a result of the step#1 cell search, a maximum energy and its corresponding PDM hypothesis are stored in the memory 211 for each of the PDM hypotheses. In this case, energies for all the hypotheses can be stored, or only the energies whose levels belong to the upper M PDM hypotheses can be stored for efficient utilization of the memory. In this manner, the upper M PDM hypotheses and their energies are stored in the memory.

If the step#1 cell search has been performed on all of the L PDM hypotheses, M PDM hypotheses are determined on the basis of the result energies of the step#1 cell search. A value determined by averaging the determined M PDM hypotheses can be used as an initial frequency offset estimation value. The PDM hypotheses are averaged to reduce errors. A method for using a hypothesis having the maximum energy as an initial frequency offset estimation value can also be used.

When the step#1 cell search is performed on the L PDM hypotheses, an order in which the PDM hypotheses are determined can be implemented in several ways. For example, the step#1 cell search can be performed in order of the smallest PDM hypothesis to the largest PDM hypothesis, or from the largest PDM hypotheses to the smallest PDM hypotheses. In addition, it is also possible to randomly extract a plurality of hypotheses from the PDM hypotheses and perform the step#1 cell search on the extracted hypotheses.

However, because a frequency offset driving a normal TCXO at a room temperature commonly has the highest probability of '0', it is efficient that an initial PDM hypothesis is set to '0' and the next hypotheses are set to befarther from '0'.

That is, preferably, an initial PDM hypothesis PH(0) is set to 0 becoming PH(0)=0, a second hypothesis PH(1) is set to a point increased by S from the PH(0) in a positive direction becoming PH(1)=S, a third hypothesis PH(2) is set to a point decreased by S in a negative direction becoming PH(2)=−S, in this manner, PH(3)=2S, PH(4)=−2S, . . . .

Meanwhile, when the step#1 cell search is performed on each of the PDM hypotheses, it is possible to obtain a more reliable result by performing asynchronous accumulation (HN times) by hardware and asynchronous accumulation (SN times) by software.

A description will now be provided of a method for calculating a time required for the initial frequency offset estimation according to an embodiment of the present invention. A time required when the PEGC is operated one time is 2560+256=2826 chips. When asynchronous accumulation is performed HN times by the hardware, HN*2826 chips are required, and when asynchronous accumulation is performed SN times by software, SN*HN*2826 chips are required. Because both perform the same procedure on L PDM hypotheses, the total required time becomes L*SN*HN*2826 chips and a software processing time is added thereto. For example, if a 9-bit PDM is used and a PDM space is S=20, then L=25 based on the above formula, and if SN=2 and HN=10, a required time becomes 1413000 chips. The chip interval is converted into about 370 ms in terms of time. In addition, if the software processing time is added thereto, the chip interval becomes 400 ms. In actual implementation, about 400–~420 ms is required.

Figure 5:
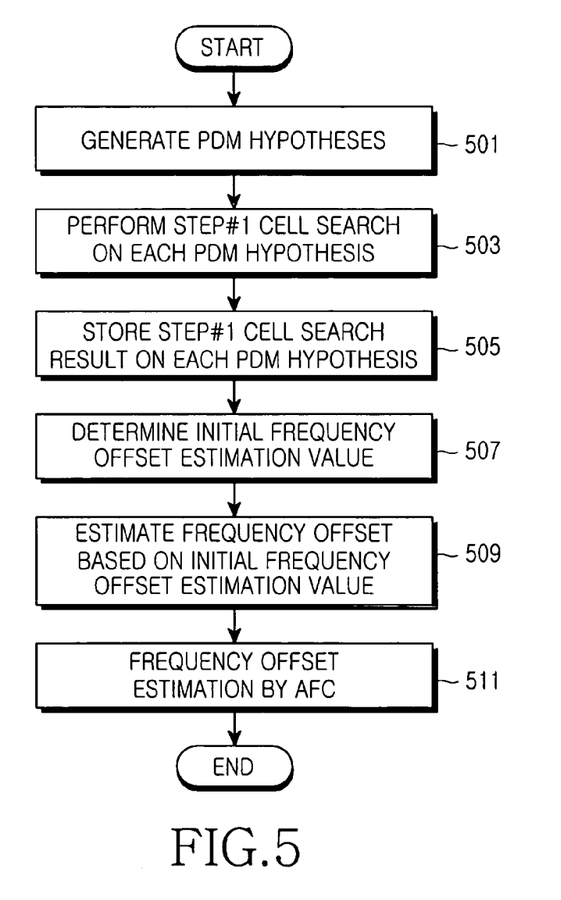
FIG. 5 is a flowchart illustrating an initial frequency offset estimation method using step#1 cell search according to an embodiment of the present invention.

With reference to FIG. 5, a description will now be made of an initial frequency offset estimation method according to an embodiment of the present invention.

FIG. 5 is a flowchart illustrating an initial frequency offset estimation method using step#1 cell search according to an embodiment of the present invention. Referring to FIG. 5, a predetermined number (e.g., L) of PDM hypotheses are generated in the method described in connection with FIG. 4 (Step 501). The generated PDM hypotheses can be stored in the memory 211 of FIG. 2. Thereafter, the step#1 cell search is performed on each PDM hypothesis in the method described in connection with FIGS. 2 and 3 (Step 503). The step#1 cell search result on each of the PDM hypotheses is also stored in the memory (Step 505). As previously described, for efficient utilization of the memory, only a predetermined number of PDM hypotheses having a maximum energy can be stored in the memory.

When the step#1 cell search has been completed for all PDM hypotheses, an initial frequency offset estimation value is determined from the stored step#1 cell search result values, i.e., peak energies (Step 507). The initial frequency offset estimation value can be determined as a PDM hypothesis having a maximum peak energy, or determined by averaging a predetermined number of PDM hypotheses having a higher peak energy.

A frequency offset is estimated based on the determined initial frequency offset estimation value (Step 509), and the process is performed by the controller 219 of FIG. 2 by selecting a result value of the initial frequency offset estimator 213. After a frequency offset is estimated by an initial frequency offset estimation value, frequency offset estimation by an AFC becomes possible. Therefore, frequency offset estimation is performed by the AFC (Step 511). The frequency offset estimation by the AFC is implemented by selecting an output value of the FDD 217 and outputting the selected value to the accumulator 221 see FIG. 2.

Meanwhile, when frequency offset estimation is not normally performed by the initial frequency offset estimation method according to an embodiment of the present invention, it is difficult to perform frequency offset estimation by the AFC. In this case, it is also possible to repeatedly perform the initial frequency offset estimation according to an embodiment of the present invention.

As can be understood from the foregoing description, embodiments of the present invention can rapidly acquire an accurate estimation value in which an individual characteristic of TCXO is reflected, in estimating an initial frequency offset for initial cell search of a UE supporting a mobile communication system. In addition, because an apparatus provided for step#1 cell search can be used in performing an initial frequency offset estimation according to an embodiment of the present invention, extra hardware is not required.

While the invention has been shown and described with reference to an embodiment thereof, it will be understood by those skilled in the art that various changes in form and details may be made therein without departing from the spirit and scope of the invention as defined by the appended claims.

What is claimed is:

1. A method for setting an initial frequency by a user equipment (UE) in a mobile communication system in which the UE performs an initial cell search in order to identify a Node B with which the UE can exchange data, the method comprising:
   performing a first step (step#1) cell search of a 3-step cell search for identifying the Node B on a plurality of predetermined frequency hypotheses through a primary synchronization channel;
   storing the cell search results;
   determining an initial frequency offset estimation value from the cell search results for the predetermined frequency hypotheses; and
   estimating a frequency offset using the determined initial frequency offset estimation value,
   wherein the predetermined frequency hypotheses are pulse duration modulation (PDM) hypotheses located at regular intervals in a loop bandwidth of an automatic frequency controller, and wherein the PDM hypotheses are PDM values.

2. The method of claim 1, wherein the step#1 cell search result on each of the PDM hypotheses comprises a maximum energy value.

3. The method of claim 1, wherein the step of determining an initial frequency offset estimation value from the cell search results for the PDM hypotheses comprises the step of determining a PDM hypothesis having a maximum energy value among the cell search results.

4. The method of claim 1, wherein the step of determining an initial frequency offset estimation value from the cell search results for the PDM hypotheses comprises the step of determining a value obtained by averaging a predetermined number of PDM hypotheses having a higher energy value among the cell search results.

5. The method of claim 1, further comprising the step of estimating a frequency offset by an automatic frequency controller after estimating a frequency offset based on the determined initial frequency offset estimation value.

6. An apparatus for setting an initial frequency in a mobile communication system in which a user equipment (UE) performs an initial cell search in order to identify a Node B with which the UE can exchange data, the apparatus comprising:
   a memory for storing a plurality of predetermined frequency hypotheses;
   a first step (step#1) cell searcher for performing a step#1 cell search of a 3-step cell search for identifying the Node B on each of the predetermined frequency hypotheses through a primary synchronization channel and outputting the cell search result to the memory; and
   an initial frequency offset estimator for determining an initial frequency offset estimation value from the cell search results for the predetermined frequency hypotheses,
   wherein the predetermined frequency hypothesis is pulse duration modulation (PDM) hypotheses located at regular intervals in a loop bandwidth of an automatic frequency controller, and wherein the PDM hypotheses are PDM values.

7. The apparatus of claim 6, wherein the step#1 cell search result on each of the PDM hypotheses comprises a maximum energy value.

8. The apparatus of claim 6, wherein the initial frequency offset estimator determines a PDM hypothesis having a maximum energy value among the cell search results.

9. The apparatus of claim 6, wherein the initial frequency offset estimator determines a value obtained by averaging a predetermined number of PDM hypotheses having a higher energy value among the cell search results.

10. The apparatus of claim 6, further comprising an automatic frequency controller for estimating a frequency offset for a received signal based on a common pilot channel.

11. The apparatus of claim 10, wherein the automatic frequency controller includes a frequency difference detector for detecting a frequency difference between a received signal and a frequency offset-estimated signal.

12. The apparatus of claim 11, further comprising a controller for selecting one of the initial frequency offset estimation value determined by the initial frequency offset estimator and an output value of the frequency difference detector.

13. The apparatus of claim 12, wherein the controller selects the output value of the frequency difference detector and performs frequency offset estimation on the selected output value by the automatic frequency controller after an initial frequency offset is estimated based on the initial frequency offset estimation value determined by the initial frequency offset estimator.

* * * * *